C. E. DATH.
FRICTION BUFFER FOR RAILWAY CARS.
APPLICATION FILED MAR. 9, 1914.

1,120,290.

Patented Dec. 8, 1914.

WITNESSES:

INVENTOR.
Charles E. Dath
BY
his ATTORNEYS.

UNITED STATES PATENT OFFICE.

CHARLES E. DATH, OF CHICAGO, ILLINOIS, ASSIGNOR TO WILLIAM H. MINER, OF CHICAGO, ILLINOIS.

FRICTION-BUFFER FOR RAILWAY-CARS.

1,120,290.         Specification of Letters Patent.         Patented Dec. 8, 1914.

Application filed March 9, 1914. Serial No. 823,303.

*To all whom it may concern:*

Be it known that I, CHARLES E. DATH, a citizen of the United States, residing at Chicago, in the county of Cook and State of Illinois, have invented a certain new and useful Improvement in Friction-Buffers for Railway-Cars, of which the following is a full, clear, concise, and exact description, reference being had to the accompanying drawings, forming a part of this specification.

My invention relates to friction buffers for railway cars.

The object of my invention is to provide a friction buffer of efficient operation.

Figure 1:
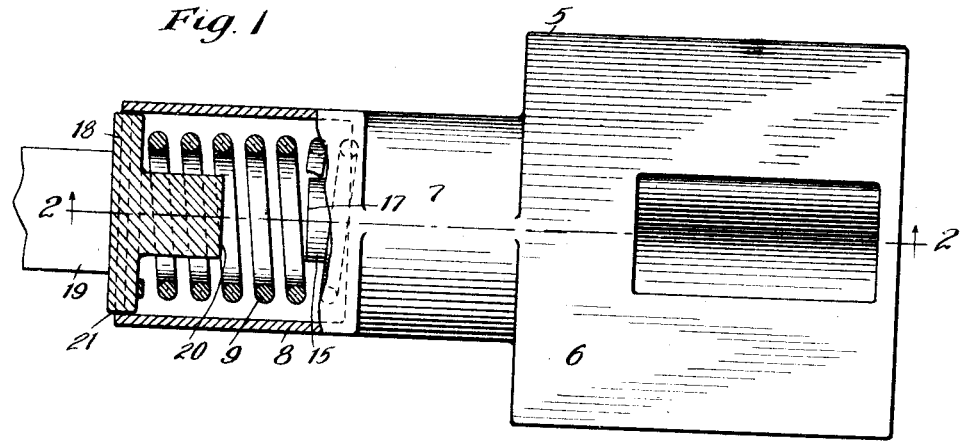
Figure 2:
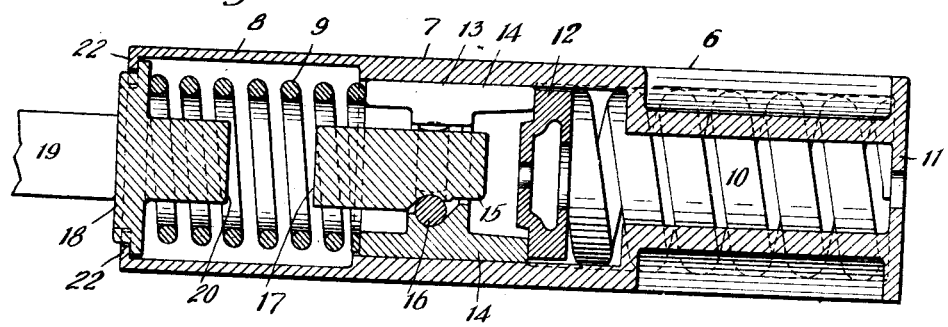
Figure 3:
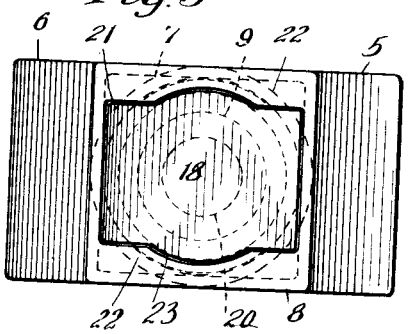
Figure 4:
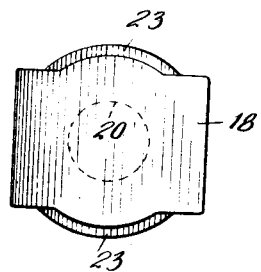

In the drawings forming a part of this specification, Figure 1 is a plan view of a buffer embodying my invention; Fig. 2 is a vertical longitudinal section on line 2—2 of Fig. 1; Fig. 3 is a front end view; and Fig. 4 is a detail showing forward buffer plate.

Referring to the drawings, the numeral 5 indicates a buffer shell having a rearward spring cage 6, preferably of a general box-like shape, and in preferable construction adapted to receive two sets of springs. It further consists of a preferably cylindrical central portion 7, comprising the friction shell; and further consists of a forward portion 8, preferably box-like in shape, to receive the initial buffer spring 9. The spring cage 6, friction shell 7, and initial spring cage 8 are integrally formed, the spring cage 6 having mounted therein in horizontal tandem arrangement the springs 10—10, the said springs being seated at their rear ends against the preferably integral plate 11 forming the rear end of the spring cage, and at their forward ends against the movable spring seat 12. The friction shell 7 has mounted therein the friction mechanism 13, comprising a plurality of annularly arranged friction shoes 14, a wedge 15 adapted to spread the shoes, and the anti-friction rollers 16—16, there being one mounted between each friction shoe and the adjacent wedging face of the wedge 15. The forward end 17 of the wedge 15 extends into the initial spring cage 8 and within the spring 9 therein. The buffer plate 18 is adapted to be engaged by the rear end of the buffer bar 19, and is provided with a rearwardly extending member 20, which is adapted to engage the wedge upon compression of the spring 9, and thus bring the friction mechanism and the springs within the spring cage 6 into compression resisting action. The initial spring 9 is forwardly seated against the buffer plate 18, and rearwardly seated against the friction shoes. At its forward end the initial spring cage 8 is provided with an opening 21 between the upper and lower in-turned shoulders 22—22. The said shoulders engage the upper and lower flanges 23—23 with which the buffer plate is provided to prevent the displacement of the buffer plate from the spring cage 8. In mounting the buffer plate 18 within the spring cage, the same is suitably turned to permit its passage between the shoulders 22—22, and is adjusted to its position as illustrated in Fig. 2 of the drawing within the spring cage 8. The shell 5 in having the integral forward portion 8 forming a chamber for the initial spring 19 is provided with an efficient means for guiding the buffer plate 18 in its rearward movement, and insuring a direct thrust against the wedging member of the friction mechanism. Further, it houses the initial spring and insures its direct, rearward compression along the line of draft through the buffer mechanism, insuring no distortion of the friction shoes in their position in relation to the wedge when in its rearward travel the projection 20 of the buffer plate comes into engagement with the wedge 15.

I claim:

1. In a buffer for railways cars, the combination with the spring cage and friction shell, springs within the spring cage, and friction mechanism within the friction shell, of an initial spring cage forwardly extended from the friction shell, and integral therewith, a spring and a buffer plate within the shell, the initial spring cage being adapted to guide the buffer plate in its longitudinal movements.

2. In a buffer for railways cars, the combination with the spring cage and friction shell, springs within the spring cage, and friction mechanism within the friction shell, of an initial spring cage forwardly extended from the friction shell, and integral therewith, a spring and a buffer plate within the shell, the initial spring cage being adapted to guide the buffer plate, the said initial spring cage being provided with inturned shoulders, and the buffer plate being provided with flanges rearwardly engaging said shoulders.

CHARLES E. DATH.

Witnesses:
ARLINE L. ROBERTSON,
CARRIE G. RANZ.